(12) United States Patent
Chiang et al.

(10) Patent No.: US 9,373,301 B2
(45) Date of Patent: Jun. 21, 2016

(54) IMAGE PROCESSING DEVICE, IMAGE PROCESSING CHIP AND IMAGE PROCESSING METHOD

(71) Applicant: MStar Semiconductor, Inc., Hsinchu Hsien (TW)

(72) Inventors: Dien-Shen Chiang, Zhubei (TW); Chin-Lung Lin, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 14/454,894

(22) Filed: Aug. 8, 2014

(65) Prior Publication Data

US 2015/0042879 A1   Feb. 12, 2015

(30) Foreign Application Priority Data

Aug. 9, 2013  (TW) .............................. 102128714 A

(51) Int. Cl.
| | |
|---|---|
| *G06F 3/00* | (2006.01) |
| *G06F 13/12* | (2006.01) |
| *G06F 13/38* | (2006.01) |
| *G09G 5/00* | (2006.01) |
| *H04N 21/4363* | (2011.01) |
| *H04N 21/4402* | (2011.01) |
| *G06F 3/12* | (2006.01) |
| *G06F 3/06* | (2006.01) |

(52) U.S. Cl.
CPC ............... *G09G 5/005* (2013.01); *G09G 5/006* (2013.01); *H04N 21/43635* (2013.01); *H04N 21/4402* (2013.01); *G06F 3/0661* (2013.01); *G06F 3/1206* (2013.01); *G09G 2370/10* (2013.01); *G09G 2370/12* (2013.01)

(58) Field of Classification Search
CPC ....... G06F 3/00; G06F 3/0661; G06F 3/1206; G06F 11/3041
USPC ..................................... 710/14, 30, 65, 67, 72
See application file for complete search history.

(56) References Cited

U.S. PATENT DOCUMENTS

| | | | | | |
|---|---|---|---|---|---|
| 8,232,820 | B2* | 7/2012 | Wang | .................. | G01R 31/3172 326/30 |
| 8,583,841 | B2* | 11/2013 | Zeng | .................... | H03L 7/0807 710/21 |
| 2003/0163628 | A1* | 8/2003 | Lin | ........................ | G06F 13/385 710/315 |
| 2008/0298504 | A1* | 12/2008 | Lee | ..................... | H04L 25/0262 375/316 |
| 2009/0125644 | A1* | 5/2009 | Yokoyama | ............. | G03B 17/00 710/11 |

* cited by examiner

*Primary Examiner* — Idriss N Alrobaye
*Assistant Examiner* — Getente A Yimer
(74) *Attorney, Agent, or Firm* — Edell, Shapiro & Finnan, LLC

(57) ABSTRACT

An image processing device for processing an image signal is provided. The image processing device includes a circuit board, a slot and an image processing module. The slot, disposed on the circuit board, is to be plugged in by either a first connector corresponding to a first image interface format or a second connector corresponding to a second image interface format. The image processing module, disposed on the circuit board and coupled to the slot, detects the image signal inputted from either the first connector or the second connector to determine a target image interface format, and processes the image signal by an image processing method corresponding to the target image interface format.

15 Claims, 4 Drawing Sheets

IMAGE PROCESSING DEVICE, IMAGE PROCESSING CHIP AND IMAGE PROCESSING METHOD

This application claims the benefit of Taiwan application Serial No. 102128714, filed Aug. 9, 2013, the subject matter of which is incorporated herein by reference.

BACKGROUND OF THE INVENTION

1. Field of the Invention

The invention relates in general to an image processing device, chip and method, and more particularly, to an image processing device, chip and method capable of automatically detecting and processing an image signal with a corresponding image processing method.

2. Description of the Related Art

Nowadays, most televisions and display devices support image signals in various image interface formats, e.g., High-Definition Multimedia Interface (HDMI) format, and DisplayPort interface format, and Mobile High-Definition Link (MHL) interface format. The HDMI connectors come in various types, of which a most common type A has 19 pins. The DisplayPort interface connectors have 20 pins. The MHL interface connector have two different ends—one end that connects to a mobile device has the same form as a micro USB connector, and the other end that connects to a television or a display device has the same form as a HDMI connector. Despite the physical connection interface compatible to the micro USB and HDMI connector, the MHL interface connector has its own coding and transmission format.

A television or display device that supports image signals in various image interface formats is provided with corresponding slots or ports. For example, a television or display device that supports image signals in HDMI format and DisplayPort interface format is provided with two slots—one for corresponding to HDMI format and the other for corresponding to DisplayPort interface format. The number of pins of the slots and that of the corresponding connectors are the same. For example, the slot corresponding to HDMI format has 19 pins (taking the most common type A for example), and the slot corresponding to DisplayPort interface format has 20 pins. A connecting interface (i.e., the connector) of a signal cable needs to be plugged into the corresponding slot, and a correct signal source is selected via an operation interface of the television or display device. As such, an image processing device or chip of the television or display device processes the image signals with the correct corresponding image processing method. Therefore, to support various image interface formats, a circuit board in a television or display device is equipped with multiple slots, which increases not only circuit complexities but also layout costs. In application, only when a connector is plugged into the correct slot and a correct signal source is selected, the television or display device may then correctly display contents. The above shortcomings bring inconveniences and disturbances upon both manufacturers and users.

SUMMARY OF THE INVENTION

The invention is directed to a method an image processing method, an image processing chip and an image processing method for solving issues of the prior art.

An image processing device for processing and image signal is provided. The image processing device includes a circuit board, a slot and an image processing module. The slot, disposed on the circuit board, is to be plugged in by either a first connector corresponding to a first image interface format or a second connector corresponding to a second image interface format. The image processing module, disposed on the circuit board and coupled to the slot, detects the image signal inputted from either the first connector or the second connector to determine a target image interface format, and processes the image signal by an image processing method corresponding to the target image interface format.

An image processing chip coupled to a slot receiving an image signal for processing the image signal and having a plurality of pins is further provided. The image processing chip detects the image signal to determine a target image interface format, and processes the image signal by an image processing method corresponding to the target image interface format. Each of the plurality of pins corresponds to a pin of the slot, and at least one of the plurality of pins of the slot is shared by a first connector corresponding to a first image interface format and a second connector corresponding to a second image interface format.

An image processing method for processing an image signal is further provided. The image processing method includes: receiving the image signal from either a first connector or a second connector via an image receiving interface having a plurality of pins, at least one of the pins being shared by the first connector and the second connector, the first connector corresponding to a first image interface format and the second connector corresponding to a second image interface format; detecting the image signal to determine a target image interface format; and processing the image signal by an image processing method corresponding to the target image interface format.

In the present invention, one single slot is provided on a circuit board or one single image receiving interface is provided on a chip to receive image signals in different image interface formats, thereby improving the issue caused by two slots or two image receiving interfaces in the prior art, such as a complex wiring layout on the circuit board, a large size of the circuit board and a large size resulted from a large pin count of the chip. Further, with a smaller number of slots, a signal receiving panel of a television or display device may be kept simple while providing better convenience.

The above and other aspects of the invention will become better understood with regard to the following detailed description of the preferred but non-limiting embodiments. The following description is made with reference to the accompanying drawings.

DETAILED DESCRIPTION OF THE INVENTION

Technical terms of the application are based on general definition in the technical field of the application. If the application describes or explains one or some terms, definition of the terms are based on the description or explanation of the application.

Figure 1:
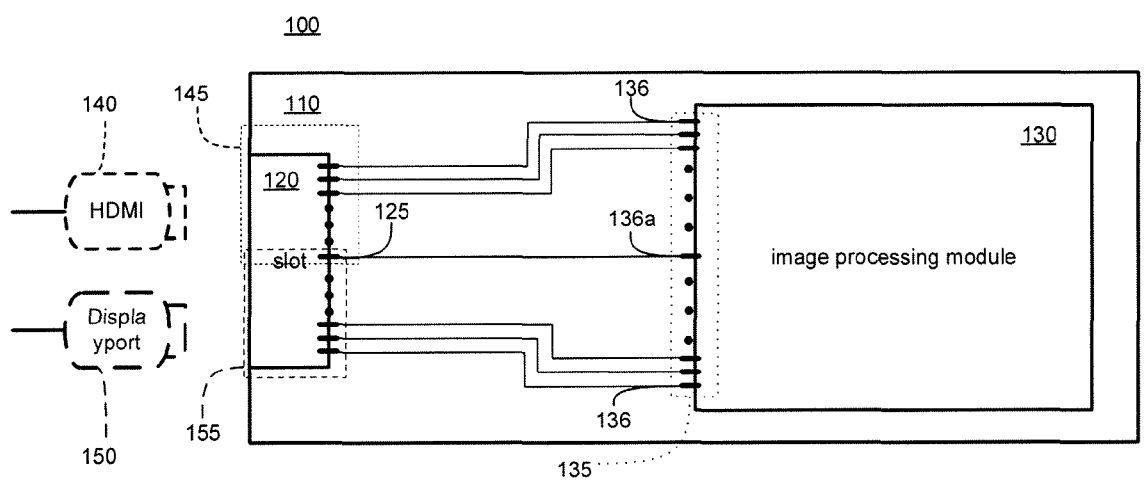
FIG. 1 is a schematic diagram of an image processing device according to an embodiment of the present invention.

FIG. 1 shows a schematic diagram of an image processing device 100 according to an embodiment of the present invention. The image processing device 100 includes a circuit board 110, a slot 120 and an image processing module 130. The slot 120 is disposed on the circuit board 110, and is coupled to the image processing module 130. The slot 120 may be plugged in by both connectors 140 and 150 corresponding to different image interface formats. For example, the connector 140 may be a HDMI connector, and the connector 150 may be a DisplayPort interface connector. The image processing module 130 may be an image processing chip, e.g., an image scalar chip. Via a conducting wire between the slot 120 and the image processing module 130 and a plurality of pins 136 (including a pin 136a), an image signal is transmitted to the image processing module 130. The pins 136 for receiving the image signal may form an image receiving interface 135 of the image processing module 130.

Fundamentally, a plurality of pins of the slot 120 and the plurality of pins 136 of the image processing module 130 exhibit one-on-one correspondence. A pin 125 is connected to the pin 136a. The pins of the slot 120 may be included in both image receiving interfaces 145 and 155, and are shared by the two image receiving interfaces 145 and 155. More specifically, the connector 140 corresponds to the image receiving interface 145, and the connector 150 corresponds to the image receiving interface 155. Therefore, the pin 125 is also shared by the connectors 140 and 150. Similarly, at one end of the image processing module 130, the pin 136a corresponding to the pin 125 is also a shared pin. As shown in FIG. 1, the connector 140 is a HDMI connector, and the connector 150 is a DisplayPort interface connector. Thus, the pins 136a and 125 are shared by the two image interface formats. The pins 136a and 125 may be singular or plural. That is, the image receiving interfaces 145 and 155 may share one or more pins.

The image processing module 130 detects an image signal to determine an image interface format of the image signal, and processes the image signal by a corresponding image processing method according to the image interface format of the image signal. For example, when the image processing module 130 determines that the image interface format of the image signal is HDMI format, the image signal is processed with an image processing method corresponding to HDMI format. Similarly, the same approach may be applied to DisplayPort interface format and MHL interface format. MHL interface format is a special interface format. Although MHL interface format adopts HDMI as a physical connection interface, image signals transmitted by MHL interface format are in fact in MHL interface format. Therefore, the image processing method 130 needs to select the image processing method corresponding to MHL interface format to correctly display contents of the image signal.

According to HDMI specifications, an $18^{th}$ pin of a connector compliant with this interface format provides a +5V voltage as a voltage source. In the embodiment, the +5V voltage is inputted into the image processing device 100. More specifically, the +5V voltage is inputted into the image processing module 130 via the conducting wire between the slot 120 and the image processing module 130. On the other hand, the DisplayPort interface format does not provide a +5V voltage as a voltage source. In one embodiment of the present invention, such characteristic of the pin is used as an identification basis for the HDMI format. That is to say, if the image processing module 130 detects that the signal corresponding to the pin provides a stable +5V voltage as a voltage source, the image interface format of the image signal is determined as HDMI format. If not detected, it means that the image interface format of the image signal may be DisplayPort interface format or MHL interface format. At this point, if the television or display device supports only one of DisplayPort and MHL interface formats, the image interface format of the image signal may be directly determined. If both of the above interface formats are supported, further detection is required to distinguish between DisplayPort and MHL interface formats. In practice, a detection circuit may be provided in the image processing device or image processing module to detect whether a predetermined reference pin of the slot 120 or the image receiving interface 135 is in a high-voltage or low-voltage level. For example, it is detected whether the $2^{nd}$ pin (cable detection pin) is at a high-voltage or low-voltage level. Details of such detection circuit are known to one person skilled in the art, and shall be omitted herein. Operation details of the present invention are described by taking an example where a reference voltage level is a high-voltage level. For a high-voltage level, the interface format of the image signal is determined as MHL interface format, or else the interface format of the image signal is determined as DisplayPort interface format.

Figure 2:
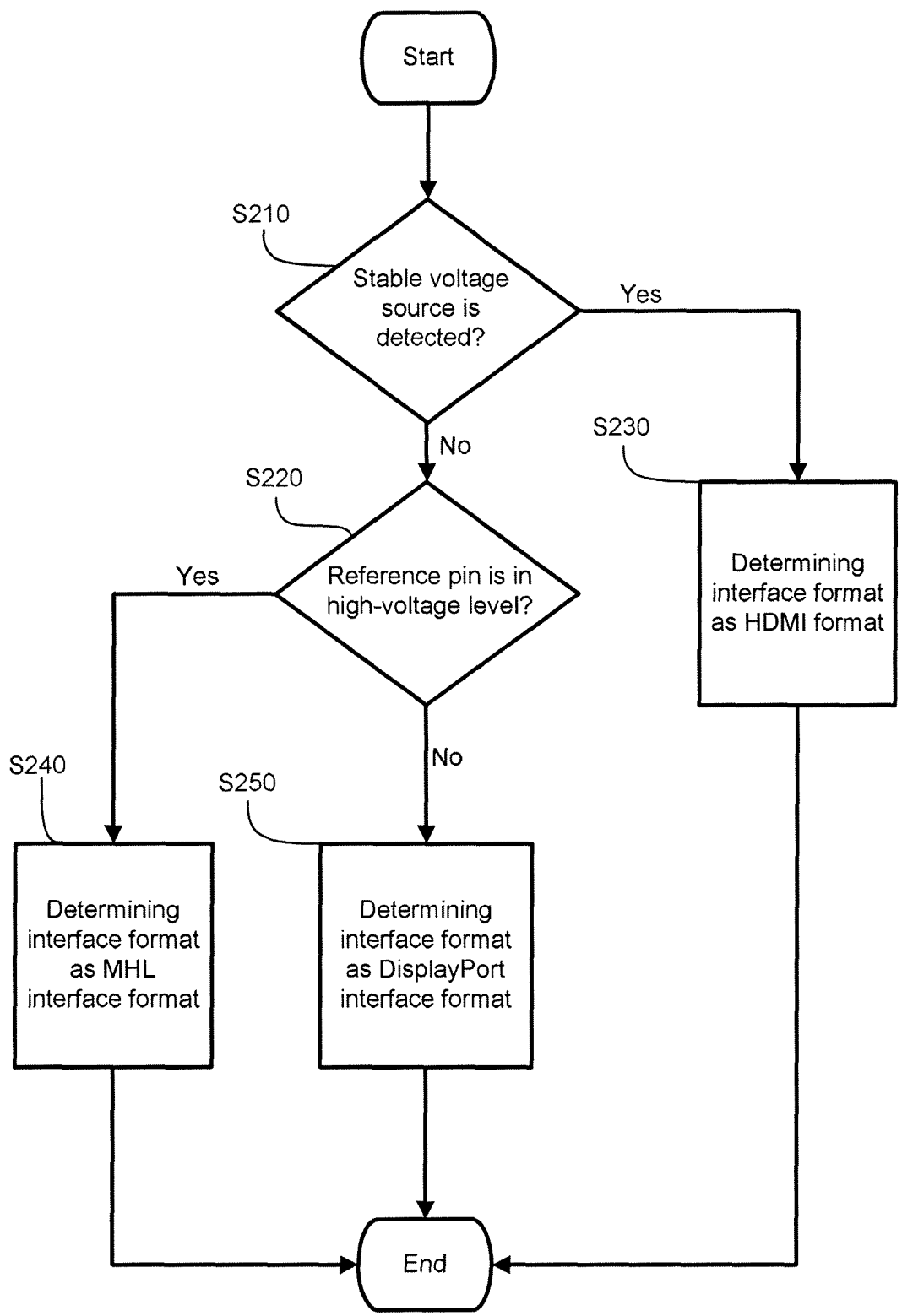
FIG. 2 is a flowchart for detecting an image interface format of an image signal according to an embodiment of the present invention.

FIG. 2 shows a flowchart for detecting an image interface format of an image signal according to an embodiment of the present invention. In step S210, it is detected whether the image signal provides a stable voltage as a voltage source at a predetermined pin. If so, it is determined in step S210 that the image interface format is HDMI format, and an image processing device or image processing module then processes the image signal by an image processing method corresponding to HDMI format. When it is detected in step S210 that the image signal does not provide a stable voltage as a voltage source, it is further detected whether a voltage level of the reference pin is at a high-voltage level in step S220. If so, it is determined in step S240 that the interface format is the MHL interface format, and the image processing device or image processing module then processes the image signal by an image processing method corresponding to MHL interface format. If not, it is determined in step S250 that the interface format is DisplayPort interface format, and the image processing device or image processing module then processes the image signal with an image processing method corresponding to DisplayPort interface format.

A situation that a television or display device supports three interface formats is described above. In another situation that only two interface formats are supported, with one being HDMI interface format and the other being DisplayPort or MHL interface format, the interface format of the image signal can be learned after step S210. In yet another situation that a television or display device may support two interface formats, with one being DisplayPort interface format and the other being MHL interface format, a detection device adopting the detection process in FIG. 2 skips step S210 and directly performs step S220 after the detection process begins.

Figure 3:
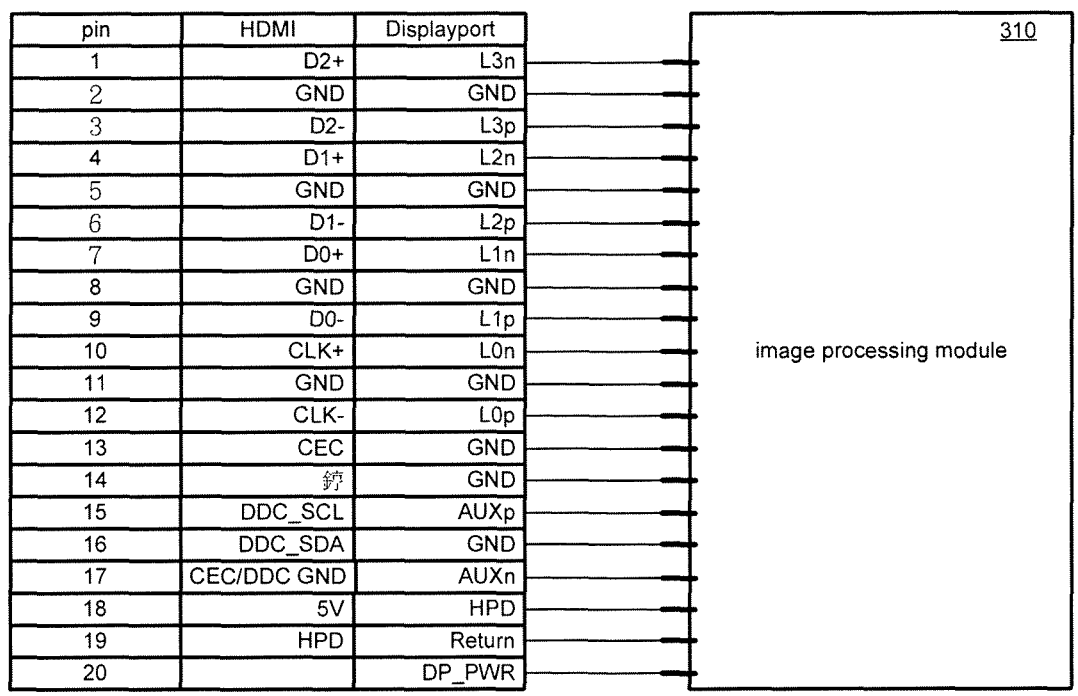
FIG. 3 is a mapping diagram of pins of an image processing device according to a preferred embodiment of the present invention.

FIG. 3 shows a mapping diagram of pins of an image processing device according to a preferred embodiment of the present invention. The table on the left half is the mapping table of pins of HDMI format or DisplayPort interface format, and the pins may be the pins of the slot 120 in FIG. 1. In the embodiment, an image processing module 310 has 20 pins, which means the corresponding slot also has 20 pins. The image processing module 310 may be an image processing chip, e.g., an image scalar chip. As shown in the table, HDMI format and DisplayPort interface format share the $1^{st}$ to $19^{th}$ pins, yielding a total pin count of 20 pins. Compared to a conventional approach of two slots that do not have shared pins and thus need a total of 39 (19+20) pins, the present invention saves 19 pins and thereby significantly reducing the area and costs for the circuit layout on the circuit board. In another preferred embodiment, the 14$^{th}$ and 20$^{th}$ may be selectively omitted to further reduce the pin count to 19 or 18. The 14$^{th}$ pin is a reserved pin corresponding to HDMI format and a grounded pin corresponding to DisplayPort interface format. The 20$^{th}$ pin is a pin providing a 3.3V voltage corresponding to DisplayPort interface format, and HDMI format does not use the 20$^{th}$ pin.

Figure 4:
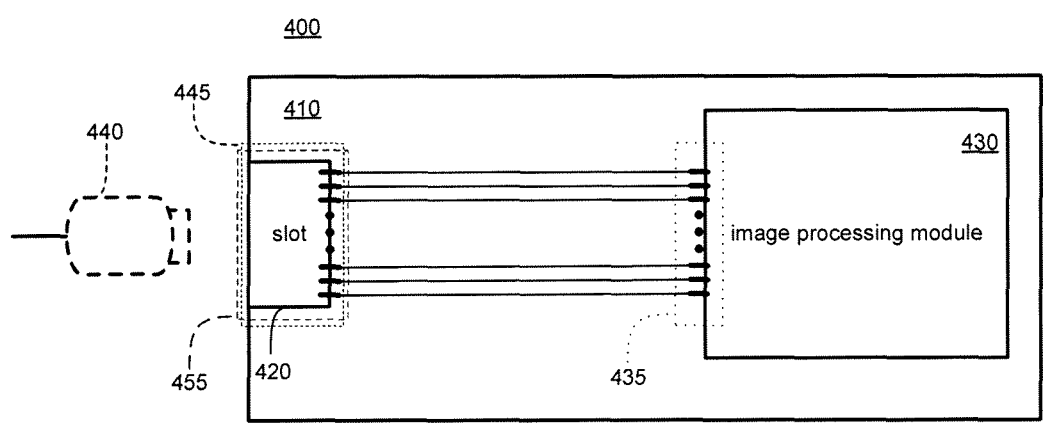
FIG. 4 is a schematic diagram of an image processing device according to another embodiment of the present invention.

FIG. 4 shows a schematic diagram of an image processing device 400 according to another embodiment of the present invention. The image processing device 400 includes a circuit board 410, a slot 420 and an image processing module 430. The slot 420 is disposed on the circuit board 410, and is coupled to the image processing module 430. The image processing module 430 may be an image processing chip, e.g., an image scalar chip.

The slot 420 may be plugged in by a connector 440 in different image interface formats. In the embodiment, two image receiving interfaces 445 and 455 share all pins of the slot 420, which means that the connector 440 may be directly plugged into the slot 420 regardless whether the connector 440 corresponds to HDMI format or DisplayPort interface format. As previously described, in a preferred situation, the number of pins of the slot 420 may be reduced to only 19, and the number of pins of the corresponding image processing module 430 may be similarly reduced to 18. That is to say, all of the pins of the image receiving interface 430 are also shared by HDMI format and DisplayPort interface format. As such, the wiring layout on the circuit board 410 is further simplified to save layout costs and reduce the size of the circuit board 410. Further, with a smaller pin count, the image processing module 430 may also be reduced in size. For a user, the one single slot that supports two image interface formats leads to better convenience.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image processing device, configured to process an image signal, comprising:
    a circuit board;
    a slot, disposed on the circuit board, to be plugged in by either a first connector corresponding to a first image interface format or a second connector corresponding to a second image interface format; and
    an image processing module, disposed on the circuit board and coupled to the slot, configured to detect the image signal inputted from either the first connector or the second connector to determine a target image interface format, and to process the image signal by an image processing method corresponding to the target image interface format,
    wherein the first image interface format is High-Definition Multimedia Interface (HDMI) format, and the second image interface format is DisplayPort interface format, and
    wherein when the image processing module detects that the image signal provides a stable voltage as a voltage source at a predetermined pin of the slot, the image processing module determines the target image interface format as HDMI format.

2. The image processing device according to claim 1, wherein when image processing module detects that the image signal does not provide a stable voltage as a voltage source at a predetermined pin of the slot, the image processing module determines the target image interface format as DisplayPort interface format.

3. The image processing device according to claim 1, wherein the first connector further corresponds to Mobile High-Definition Link (MHL) interface format; when the image processing module detects that the image signal does not provide a stable voltage as a voltage source at a predetermined pin, the image processing module further detects whether a predetermined reference pin of the slot is at a reference voltage level; if so, the image processing module determines the target image interface format as MHL interface format, or else the image processing module determines the target image interface format as DisplayPort interface format.

4. The image processing device according to claim 1, wherein the first image interface format is MHL interface format, and the second image interface format is DisplayPort interface format; the image processing module detects whether a predetermined reference pin of the slot is at a reference voltage level; if so, the image processing module determines the target image interface format as MHL interface format, or else the image processing module determines the target image interface format as DisplayPort interface format.

5. The image processing device according to claim 1, wherein the image processing module is an image scalar chip.

6. The image processing device according to claim 1, wherein the slot has a plurality of pins, and at least one of the pins is shared by the first connector and the second connector.

7. An image processing chip, coupled to a slot receiving an image signal to process the image signal, comprising a plurality of pins, the image processing chip detecting a target image interface format and processing the image signal by an image processing method corresponding to the target image interface format, wherein each of the plurality of pins corresponds to a pin of the slot, and at least one of the plurality of pins of the slot is shared by a first connector corresponding to a first image interface format and a second connector corresponding to a second image interface format,
    wherein the first image interface format is HDMI interface format, and the second image interface format is DisplayPort interface format, and
    wherein when the image processing chip detects that the image signal provides a stable voltage as a voltage source at a predetermined pin of the slot, the image processing chip determines the target image interface format as HDMI format.

8. The image processing chip according to claim 7, wherein when image processing chip detects that the image signal does not provide a stable voltage as a voltage source at a predetermined pin of the slot, the image processing chip determines the target image interface format as DisplayPort interface format.

9. The image processing chip according to claim 7, wherein when the image processing chip detects that the image signal does not provide a stable voltage as a voltage source at a predetermined pin of the slot, the image processing chip further detects whether a predetermined reference pin of the slot is at a reference voltage level; if so, the image processing chip determines the target image interface format as MHL interface format, or else the image processing chip determines the target image interface format as DisplayPort interface format.

10. The image processing chip according to claim 7, wherein the first image interface format is MHL interface format, and the second image interface format is DisplayPort interface format; the image processing chip detects whether a predetermined reference pin of the slot is at a reference voltage level; if so, the image processing chip determines the target image interface format as MHL interface format, or else the image processing chip determines the target image interface format as DisplayPort interface format.

11. The image processing chip according to claim 7, wherein the image processing chip is an image scalar chip.

12. An image processing method, for processing an image signal, comprising:
   receiving the image signal from either a first connector or a second connector via an image receiving interface, wherein the image receiving interface comprises a plurality of pins, at least one of the pins is shared by the first connector and the second connector, and the first connector corresponds to a first image interface format and the second connector corresponds to a second image interface format;
   detecting the image signal to determine a target image interface format; and
   processing the image signal by an image processing method corresponding to the target image interface format,
   wherein the first image interface format is HDMI format, and the second image interface format is DisplayPort interface format,
   wherein when the detecting step detects that the image signal provides a stable voltage as a voltage source at a predetermined pin of the image receiving interface, the target image interface format is determined as HDMI format.

13. The image processing method according to claim 12, wherein when the detecting step detects that the image signal does not provide a stable voltage as a voltage source at a predetermined pin of the image receiving interface, the target image interface format is determined as DisplayPort interface format.

14. The image processing method according to claim 12, wherein when the detecting step detects that the image signal does not provide a stable voltage as a voltage source at a predetermined pin of the image receiving interface, the detecting step further detects whether a predetermined reference pin of the image receiving interface is at a reference voltage level; if so, the target image interface format is determined as MHL interface format, or else the target image interface format is determined as DisplayPort interface format.

15. The image processing method according to claim 12, wherein the first image interface format is MHL interface format, and the second image interface format is DisplayPort interface format; the detecting step detects whether a predetermined reference pin of the image receiving interface is at a reference voltage level; if so, the target image interface format is determined as MHL interface format, or else the target image interface format is determined as DisplayPort interface format.

* * * * *